June 21, 1966  J. L. GIOVINAZZO  3,257,123
SPRING SUSPENSION SYSTEM FOR A VEHICLE
Filed June 2, 1964
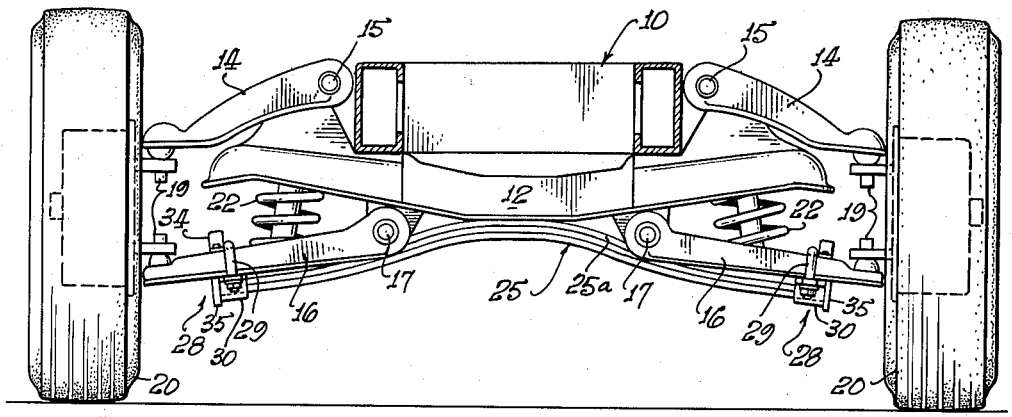
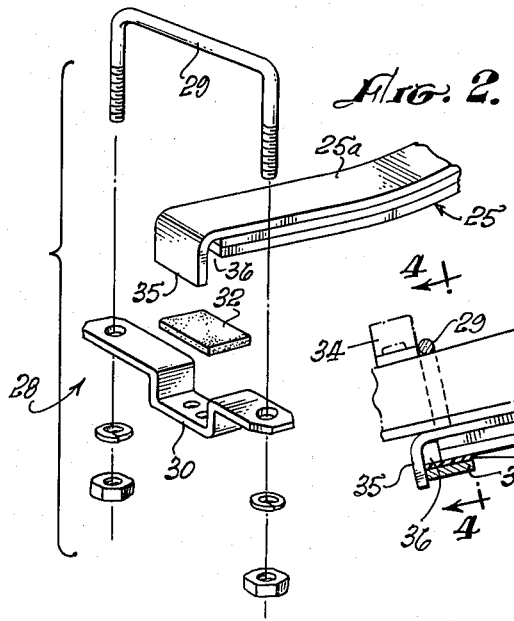
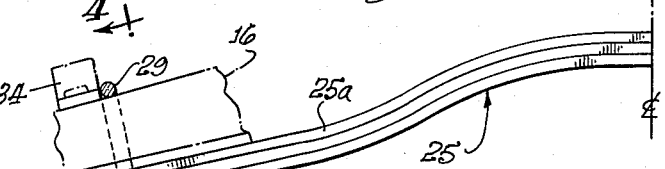
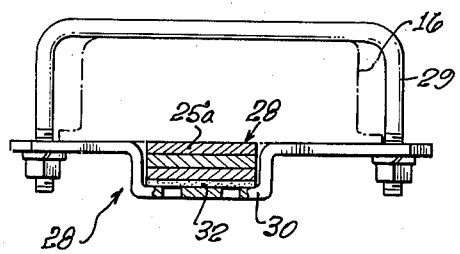
JOE L. GIOVINAZZO,
INVENTOR.
BY
ATTORNEY United States Patent Office 3,257,123
Patented June 21, 1966

3,257,123
SPRING SUSPENSION SYSTEM FOR A VEHICLE
Joe L. Giovinazzo, Los Angeles, Calif., assignor to Cambria Spring Company, Los Angeles, Calif., a corporation of California
Filed June 2, 1964, Ser. No. 372,038
2 Claims. (Cl. 280—124)

The present invention relates generally to automobiles, either trucks or passenger vehicles; but more especially is it concerned with front end suspensions for such vehicles wherein the wheels are individually sprung.

Originally, it was common practice in automotive vehicles to use a transverse leaf spring over a fixed axle at the front end of the vehicle, the wheels being pivoted to the axle at opposite ends thereof to permit the vehicle to be steered. In this case, the axle was a single, rigid member. This construction was simple and rugged in construction but inclined to be rather hard riding since the springs were often comparatively stiff.

With the advent of independent springing for the front wheels of the vehicle, individual springs for each wheel were introduced into the design of the suspension. This brought about the suspension design which includes a coil spring associated with each wheel. In general, coil springs of this type produce a softer, more comfortable ride for the passengers in the vehicle, but this same characteristic introduces certain limitations in the springs which may be described generally as a lack of flexibility or range in the load which they are adapted to carry. The coil springs are generally characterized by being "soft," that is, they produce a relatively large deflection for a given increment in load. As a result of this characteristic, they operate satisfactorily only within a comparatively narrow range of loads and are easily overloaded.

This characteristic produces a relatively serious problem when it is desired to add substantially to the total load carried, as, for example, by replacing the vehicle body with a substantially heavier one or in some other way modifying the body or its load so that a substantial increase in the total load carried results. A vehicle is originally designed and built to carry on the springs a given load, including the body; and an increase in the body weight added to a normal maximum live load may cause sufficient deflection in the springs that trouble is encountered, especially when driving on rough roads. Overloading the front end sometimes makes steering difficult or produces excessive tire wear because of the positions assumed by the wheels under load.

The normal reaction to this situation is to strengthen the existing springs; but in the case of coil springs, it is not possible to change the spring rate without replacement of the springs in their entirety. Usually this is quite impractical as no replacement spring is available that will fit. It should be appreciated that a replacement for a coil spring must have the same overall dimensions and still have a higher spring rate; and this is a condition which it is ordinarily impossible to satisfy unless the new spring is custom built. But even if a replacement spring were available, this is an expensive procedure because of the time and effort required to exchange the springs and the fact that the original springs are then of no value and are discarded.

Thus it becomes a general object of the present invention to design a front end suspension for a vehicle having independently sprung wheels, in which the springs can be modified or strengthened simply, quickly, and economically to adapt the vehicle to an increased load, either of a constant magnitude or a variable one.

A further object of the invention is to design a suspension of this type for loads heavier than originally intended, without overstressing or weakening any of the original elements of the suspension system, thus eliminating any possible need for replacement or reinforcing of elements of the originial design.

It is also an object of the invention to provide a vehicle suspension of the type described which, under increased loads, provides for improved steering and handling of the vehicle, thus contributing to the ease of control and safety of the vehicle.

These objects of the invention have been achieved by providing in a suspension system for the front wheels of a vehicle a combination including a rigid crossbeam extending transversely of the vehicle and attached to the vehicle frame; an arm pivotally connected at its outer end to a wheel and pivotally connected at its inner end to the crossbeam; a first spring means, normally a coil spring, interposed between the arm and the crossbeam; and a second spring means, normally a leaf spring, located beneath the crossbeam and bearing upwardly against the crossbeam and the underside of the pivoted arm. The leaf spring is sufficiently long that the outer end of it extends to a point between the outer end of the arm and the coil spring, thus reducing the stresses in the arm produced by the increased loads. In normal practice, a leaf spring engages the crossbeam centrally thereof and extends out to engage at each end the pivoted arm carrying a wheel at opposite sides of the vehicle.

A bracket of novel design clamps the outer end of the leaf spring to the arm, such bracket means including a U-bolt passing over the arm and a strap passing under the arm and held in place by the U-bolt. The strap encompasses the leaf spring on three sides to hold the leaf spring in place against lateral displacement while still allowing limited longitudinal movement of the spring relative to the arm and to the strap. One leaf of the spring is bent at the end to engage a side of the strap and hold the spring against longitudinal displacement in one direction, this same bent portion of one leaf serving to longitudinally restrain any spring leaves below it.

How these objects and advantages of the present invention are attained, as well as others not specifically referred to herein, will be better understood by reference to the following description and to the annexed drawing, in which:

FIG. 1 is a front elevation of a vehicular suspension system embodying the present invention;

FIG. 2 is an exploded perspective of the bracket means for clamping the end of the spring to the pivoted arm;

FIG. 3 is an enlarged fragmentary elevation and section through the bracket means showing the construction of the bracket and the spring at the point of engagement by the bracket; and FIG. 4 is a vertical section on line 4—4 of FIG. 3.

Referring now to the drawing, and particularly to FIG. 1, there is shown a front end suspension of typical design attached to the frame of the vehicle indicated generally at 10. The suspension includes a crossbeam 12 which is typically disposed beneath the frame members 10, to which it is attached, and which extends transversely of and laterally beyond the frame at both ends. Near each end of crossbeam 12 is an upper arm 14 which is pivotally connected at 15 to the crossbeam. Also at each side of the center of the beam is a lower arm 16 which is pivotally connected at 17 to the crossbeam, typically at a position below and somewhat inwardly with respect to the pivot 15.

The pivots 15 and 17 are located near the inner ends of the arms 14 and 16, respectively, while the outer ends of these two arms are each adapted for pivotal connection to a road or ground-engaging wheel 20. These last-mentioned pivotal connections, indicated at 19, are vertically aligned and establish a vertical axis about which wheel 20 can turn in order to steer the vehicle.

Interposed between each lower arm 16 and the crossbeam 12 is a coil spring 22. Spring 22 bears against the lower arm at a position located more or less centrally of the arm while it bears against the underside of crossbeam 12 at a position adjacent one end of the beam. The spring is held in compression between these two members and, in effect, supports the beam near one end so that a greater load transmitted from the beam to the spring causes the spring to be compressed axially.

Disposed beneath crossbeam 12 and the two lower arms 16 is the leaf spring assembly indicated generally at 25. While the exact shape of the spring assembly can be varied from that shown in order to adapt it to a particular vehicle, in general it is bowed upwardly in its central portion so that the upwardly convex portion of the spring bears against the underside of crossbeam 12 at the center of the crossbeam. The spring extends transversely of the vehicle underneath crossbeam 12 and is sufficiently long that the ends of the spring are each located preferably somewhere between a coil spring 22 and the wheel pivots 19.

At each end, leaf spring 25 bears upwardly against the underside of a lower arm 16 to which it is fastened by bracket means indicated generally at 28.

As may be seen by reference to FIG. 2, each bracket assembly 28 comprises a U-bolt 29 threaded on both ends, a shaped strap 30 having at each end a hole to receive the U-bolt, and nuts 31 which are screwed onto the threaded ends of the U-bolt. The U-bolt passes over an arm 16 while strap 30 passes under the arm and the end of the leaf spring so that by tightening nuts 31 on the ends of the U-bolt, the spring is held by the U-bolt in engagement with the underside of said arm 16, as shown particularly in FIG. 4. The bracket assembly may include an insert 32 of a fabric impregnated with a lubricant, or of a synthetic plastic such as "Nylon," to reduce any squeaking resulting from relative movement of the leaves of the spring and the bracket, as is well known in the art. The brackets are normally installed with the U-bolts adjoining a bumper block 34 or other upwardly projecting member on the control arm which holds the U-bolt and the bracket against movement outwardly along the arm.

The top leaf 25a of the leaf spring is bent downwardly at each end, as may be seen in FIGS. 2 and 3. This bent-over portion 35 of the spring engages one side of strap 30 to prevent longitudinal movement of the spring in one direction with respect to the bracket and control arm. Since the spring is thus restrained at both ends, it is thereby held against longitudinal movement in both directions by the two brackets on the two arms 16.

Spring leaf 25a having the bent-over portion 35 is preferably the top leaf of the assembly of the spring, the spring typically having three leaves as shown, although a larger or smaller number may be used as desired according to the load carried and the ride characteristics to be obtained. By placing the stop portion 35 on the top leaf, this bent-over portion acts to limit longitudinal movement of the spring leaves below leaf 25a by engagement with them. In the normal position, there is preferably a small space between the end of the leaves below the top leaf and bent-over portion 35, as indicated at 36 in FIG. 3, in order to provide for limited endwise movement of the leaves in the spring relative to one another as the spring flexes under normal deflections encountered as the vehicle moves over a road. However, any endwise movement of the lower leaves in excess of this limited movement normally contemplated is prevented by engagement of the leaves at their ends with the bent portion 35 of the top leaf.

The bracket means 28 at each end of the transverse leaf spring is sufficient to hold the leaf spring securely in place against longitudinal or lateral displacement. As is evident from FIG. 4, strap 30 of the bracket at each end encompasses three sides of the spring, thus holding the spring against shifting sideways as well as dropping away from the control arm. This restraint upon the ends of the spring coupled with the firm engagement of the spring with an underside of the control arm at each end of the spring holds the spring firmly in place and renders unnecessary any attachment means at the center of the spring connecting the spring to crossbeam 12. Spring 25 is under some stress at all times since it is designed to take a portion of the dead load of the vehicle as well as any live load, and this distribution of the forces holds the crossbeam firmly in contact with the upper face of the central portion of the spring.

This particular configuration of the spring has several advantages and one of these is distribution of the additional load on the lower control arm 16 caused by increasing the load of the vehicle. If only coil springs 22 were employed to carry the increased load of the vehicle, then the portion of the control arm between spring 22 and the steering pivots 19 would be subjected to a proportionately greater stress in bending. However, with the arrangement shown, a portion of the load is transmitted to the control arm at a point between spring 22 and pivots 19. As a consequence, the bending stresses in the control arm may be actually reduced from the stresses present with the original springing of the vehicle, in spite of the fact that the vehicle loading is heavier after spring 25 has been added. Because of this condition existing, it is not necessary to reinforce or redesign the lower control arms to carry the heavier loads of the vehicle, as could very well be the situation if heavier springs 22 where substituted and thus a greater load was applied to the control arms only at the contact with the coil springs.

Another advantage is that the transverse leaf spring can be installed on a vehicle without in any way changing or modifying the original suspension. All that is required is to place the center of spring 25 on a jack, place the jack and spring underneath crossbeam 12 and raise the vehicle sufficiently that the control arms drop down onto the ends of the spring. After this, the bracket assemblies 28 can be installed at the ends of the spring, the U-bolts tightened and the newly installed spring becomes fully effective at all times. No holes are drilled or welding done which would weaken the original parts.

Addition of the leaf spring does not adversely affect the steering geometry or in any way disturb or modify the linkage of the front end suspension. The distribution of the loads is such that steering and handling of the vehicle is generally easier than would be the case with the entire load carried on the coil springs, thus contributing to safety and stability of the vehicle.

From the foregoing description, it will be seen that various changes can be incorporated in the details of construction and in attachment of the springs of the present invention and, accordingly, the foregoing description is considered to be illustrative of, rather than limitative upon, the invention as defined by the appended claims.

I claim:

1. An independent suspension system for the road wheels of an automotive vehicle having a frame, comprising in combination:

a rigid crossbeam extending transversely of the vehicle and attached to the vehicle frame;

a pair of arms of which each arm is pivotally connected at its inner end to the crossbeam and is pivotally connected at its outer end to a road wheel;

a coil spring interposed between each arm and the crossbeam;

an upwardly convex leaf spring engaging the underside of the crossbeam in load-receiving relation at a single location centrally of the crossbeam and of the leaf spring, the ends of the leaf spring each being coupled to one of the arms at a position outwardly of the coil spring associated with the respective arm;

and means for connecting the leaf spring at each end to an arm allowing limited movement of the spring relative to the arm in one direction, said means engaging the spring to hold it against relative movement in the opposite direction.

2. An independent suspension system for the road wheels of an automotive vehicle having a frame, comprising in combination:
- a rigid crossbeam extending transversely of the vehicle and attached to the vehicle frame;
- a pair of arms of which each arm is pivotally connected at its outer end to a road wheel and pivotally connected at its inner end to the crossbeam to swing about a horizontal axis;
- a coil spring interposed between each arm and the crossbeam;
- an upwardly convex leaf spring engaging the underside of the crossbeam in load-receiving relation at a single location substantially midway of its ends and extending longitudinally thereof to engage at each end and bear against the underside of an arm;
- and bracket means clamping each outer end of the leaf spring to the arm engaged thereby, said bracket means and the outer end of the leaf spring being located outwardly of the coil spring.

References Cited by the Examiner

UNITED STATES PATENTS

| | | | |
|---|---|---|---|
| 2,025,721 | 12/1935 | Broulhiet | 267—19 |
| 2,254,282 | 9/1941 | Griswold | 280—124.1 |
| 2,496,906 | 2/1950 | Churchill | 267—19 |
| 2,497,459 | 2/1950 | Leighton | 267—11 |
| 2,741,475 | 4/1956 | Roehrig | 267—16 X |
| 3,079,138 | 2/1963 | Vogt | 267—47 |
| 3,149,855 | 9/1964 | Adloff | 280—96.2 |
| 3,170,682 | 2/1965 | Eggers | 280—124.1 X |

FOREIGN PATENTS 1,161,498    3/1958    France.

BENJAMIN HERSH, *Primary Examiner.*

W. D. MARCONTELL, *Assistant Examiner.*